Aug. 14, 1956     F. W. STEIN     2,759,147

APPARATUS FOR TESTING MATERIALS

Filed July 5, 1955

INVENTOR.
Frederick W. Stein
BY
ATTORNEY.

United States Patent Office 2,759,147
Patented Aug. 14, 1956

2,759,147

APPARATUS FOR TESTING MATERIALS

Frederick W. Stein, Atchison, Kans.

Application July 5, 1955, Serial No. 519,933

13 Claims. (Cl. 324—61)

The present invention relates to apparatus for performing electrical tests on fluent materials and it deals more particularly with apparatus of the general class shown in Stein Patent 2,251,641, issued August 5, 1941; Bartlett Patent 2,266,114, issued December 16, 1941; Stein Patent 2,593,807, issued April 22, 1952; and Kimball et al. Patent 2,593,766 issued April 22, 1955.

The object of my invention, broadly speaking, is to provide an improved sample-receiving cell which can be used in conjunction with known test circuits to perform the desired tests on fluent material more rapidly, efficiently and reliably than heretofore has been possible.

Another object is to provide a test cell which can be loaded with the test material and unloaded very quickly, easily and efficiently; and in which tests on separate specimens of a given material can be carried out successively in a fraction of the time heretofore required.

A further object is to provide apparatus having the foregoing advantages and features, which is at the same time economical to manufacture, troublefree in operation and extremely easy to use in a manner which will give accurate and reliable results.

Additional objects and features of the invention together with other advantages of my improved test cell will appear in the course of the following descpirtion.

In the drawings which form a part of the specification and should be read in conjunction therewith, and in which like reference numerals indicate like parts of the various views.

Figure 3:
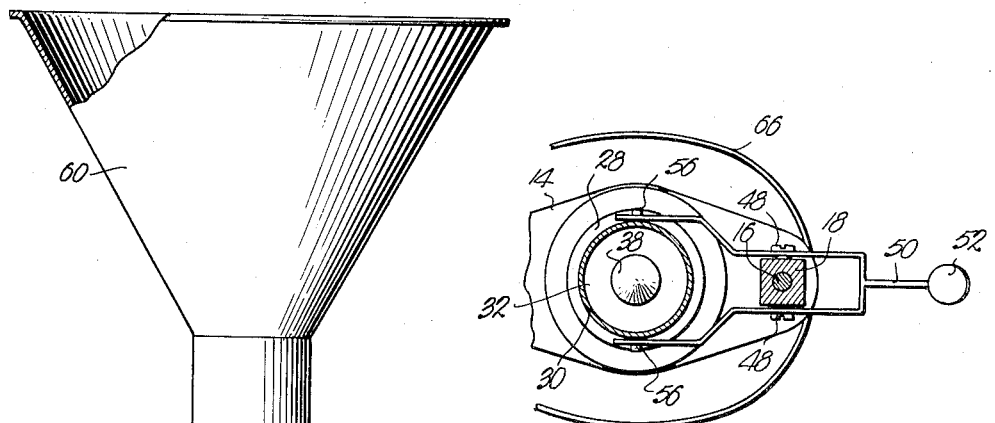
Fig. 3 is a fragmentary sectional elevation taken along the line 3—3 of Fig. 2 in the direction of the arrows.

Referring more particularly to the drawings, my unit has a rigid frame comprising a horizontal upper plate 10 which conveniently can be rectangular in shape, a bottom cross bar 12 and an intermediate generally oval plate 14. A pair of laterally spaced vertical rods threaded at their lower ends have their upper extremities secured to the plate 10 as by welding or swaging, and these extend through registering apertures at the opposite ends of members 12 and 14. Encircling the rods are two pairs of spacing sleeves 18 and 20, the first pair being above plate 14 while the second pair is below, and the entire assembly is clamped together by nuts 22 received on the threaded lower ends of the rods 16.

Figure 1:
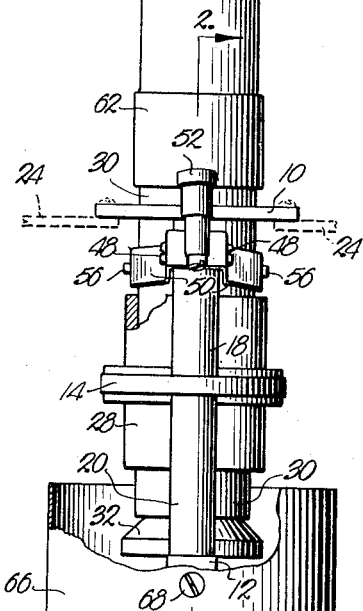
Fig. 1 is an elevational view of my improved test cell, parts having been broken away for purposes of illustration.
Figure 2:
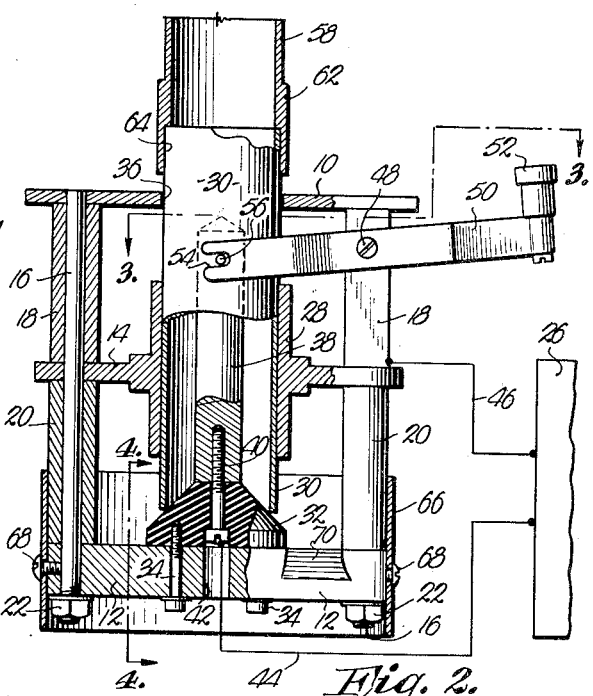
Fig. 2 is a sectional elevation taken approximately along the line 2—2 of Fig. 1 in the direction of the arrows, the electrical connections to the test cell being shown schematically.
Figure 4:
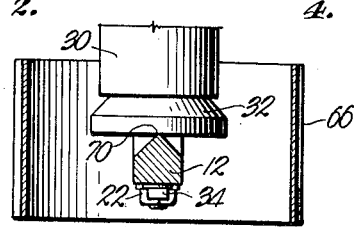
Fig. 4 is a cross-sectional view taken along the line 4—4 of Fig. 2 in the direction of the arrows.

In practice this rigid frame assembly is supported by the upper plate 10 which is mounted on an apertured horizontal panel 24 of the testing apparatus (see dotted lines in Fig. 1) so that the major portion of my device is concealed below the panel. Conveniently this panel can be the upper cover of a box-like housing that is used to enclose the circuit components of the test apparatus shown schematically at 26 (Fig. 2).

Midway between its ends plate 14 has an integral vertical sleeve 28 which slidably supports an upright tubular outer electrode 30. Under the influence of gravity the lower extremity of cylinder 30 seats on the tapered walls of a truncated conical insulator 32, this being secured to the upper surface of the cross bar 12 by means of screws 34. With the lower end thus seated, the upper end of tube 30 projects through a registering circular opening 36 in the plate 10 so that it terminates a short distance above the plate.

Within the tubular outer electrode is a coaxial inner electrode 38, this comprising a cylindrical post tapered at its upper end. The lower end of the post is seated on insulator 32 as shown, and is secured thereto by a screw 40 whose head is countersunk in the base of the insulator. Immediately below the screw head, cross bar 14 contains a vertical bore 42 through which electrical connection is made to the central electrode by means of a conductor 44 extending from the screw 40 to the test apparatus 26; electrical connection to the outer electrode is made by a second conductor 46 extending from the test apparatus and connecting to sleeve 28 or to any convenient part of the frame of my device.

Pivoted to the frame at 48 is a bifurcated lever arm 50 having a finger knob 52 at its outer end. At its inner end the two halves of the lever straddle the outer electrode and each contains a slot 54 in which is received a pin 56 projecting laterally from the side wall of the tube 30. Thus, referring to Fig. 2, when the finger knob 52 is pressed downwardly, lever 50 turns clockwise about pivot 48, lifting tube 30 in sleeve 28 thereby to unseat the lower end of the tube from the insulator disc 32.

In the drawings I have shown at the upper end of the cylindrical electrode 30 a removable extension tube 58 having the same inside diameter. The top of this is flared upwardly to form a funnel-like hopper 60 and at its lower end the extension tube has an integral enlargement 62 which is counterbored at 64 to slide over the exterior of the electrode 30.

In making multiple tests on a given material, say, wheat or flour, this material is poured into the hopper until it fills the column formed by tubes 30 and 58 and at least partly fills the hopper as well. The electrical apparatus 26 is used in the customary fashion to make the initial test on the material surrounding the central electrode 38 in the base of the column, after which finger knob 52 is depressed to unseat tube 30 momentarily. This permits the material occupying the lower portion of the column to discharge into a waste receptacle (not shown) positioned below the unit while the material higher in the column feeds downwardly therein; thus, when tube 30 reseats on insulator 32, a fresh batch surrounds the inner electrode 38 ready for testing.

This operation can be repeated as long as sufficient material remains in the column to cover the top of electrode 38, and I prefer to make the capacity of the extension tube 58 and hopper 60 sufficient to permit making five or six successive tests without refilling. This assumes that electrode 30 is unseated long enough after each test to completely change the material in the test region surrounding electrode 38; it will be understood, however, that knob 52 can be depressed for a shorter interval after each test if desired, in which case only a partial change is effected, the material surrounding the upper portion of post 38 in one test being advanced downwardly in the cell for the next test but not being completely discharged. Accordingly, the successive tests are overlapping in character, and a larger number of them can be made with a given amount of starting material than is the case if there is a complete change of material after each test. In either event it is contemplated that the successive readings taken with apparatus 26 will be averaged to obtain the final result.

If multiple tests are not desired for the purpose of obtaining an average reading on a rather large sample of material, the extension tube 58 can be removed from the upper end of electrode 30 and only enough material inserted into the test cell to approximately fill it to its upper rim. In every test the material should cover the top of electrode 38 but it is found in practice that the upper limit of the effective test region is approximately flush with plate 10 even though the material may be higher than that in the column.

I prefer to enclose the lower portion of my frame in an oval skirt 66 which is secured to the cross bar 12 by screws 68. When the finger knob 52 is depressed to permit test material to discharge from the bottom of the test cell, this skirt prevents it from scattering laterally and directs it downwardly into the aforementioned waste receptacle. The exposed portions of bar 12 between insulator 32 and each spacing sleeve 20 are beveled upwardly to form a knife edge 70 so none of the material discharged from the lower end of the cell can rest on the bar; this, in other words, prevents accumulations which might otherwise serve to foul the operation of the apparatus.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a test cell for fluent materials, a pair of spaced apart electrodes, one comprising an upright post and the other comprising a tube coaxial with said post, a frame fixedly connected to one of said electrodes and slidably supporting the other for axial movement relative to said one electrode, one of said electrodes having an insulating disc secured thereto and the lower end of the other electrode being adapted to seat against said disc in one relative position of the two electrodes, whereby said disc closes the lower end of the space between said electrodes in said one position thereof.

2. A test cell as in claim 1, having a funnel-shaped hopper at the upper end of said tube, said hopper being spaced above the top of said post.

3. A test cell as in claim 1, having an extension tube removably connected to the upper end of said coaxial tube.

4. A test cell as in claim 3 having a funnel-shaped hopper at the upper end of said extension tube.

5. In a test cell for fluent materials, a pair of spaced apart electrodes, one comprising an upright post and the other comprising a tube encircling said post, a frame fixedly connected to one of said electrodes and slidably supporting the other for axial movement relative to said one electrode, a lever arm pivotally mounted on said frame and having one end connected to said other electrode for sliding it upon pivotal movement of said arm, one of said electrodes having an insulating disc secured thereto, and the lower end of the other electrode being adapted to seat against said disc in one relative position of said two electrodes, whereby said disc closes the lower end of the space between said electrodes in said one position thereof.

6. In a test cell for fluent materials, a pair of electrodes, one comprising an upright post and the other comprising a tube coaxial with said post, an outwardly projecting insulator disc at the base of said post, a frame supporting said disc and post, means on said frame slidably supporting said tube for vertical movement, whereby the lower end of the tube normally seats on said disc under the influence of gravity, and means on said frame operatively connected to said tube for raising same to unseat said tube.

7. A test cell as in claim 6 wherein the upper surface of said disc is tapered axially upward, and the lower end of said tube normally seats on said tapered portion.

8. A test cell as in claim 6 having on said frame an annular skirt spaced outwardly from said disc.

9. In a device of the character described, a frame, an upwardly tapered frusto-conical insulator on said frame, a post supported on said insulator and extending upwardly therefrom, said frame having a stationary sleeve coaxial with said post and spaced above said insulator, a tube slidably received in said sleeve and having its lower end normally seated on the tapered portion of said insulator under the influence of gravity, and means on said frame operatively connected to said tube for raising same, thereby to unseat the tube.

10. A device as in claim 9 wherein said last means comprises a lever pivoted on said frame to turn about a horizontal axis and having one end operatively connected to the exterior of said tube.

11. A test cell as in claim 9 having a funnel-shaped hopper at the upper end of said tube, said hopper being spaced above the top of said post.

12. A test cell as in claim 9 wherein said tube has an extension tube removably connected to the upper end thereof.

13. A test cell as in claim 9 having a funnel-shaped hopper at the upper end of said extension tube.

References Cited in the file of this patent

UNITED STATES PATENTS 2,440,386     Stein _____ Apr. 27, 1948

FOREIGN PATENTS 559,240     Great Britain _____ Feb. 10, 1944